US012652622B2

(12) United States Patent
Wang et al.

(10) Patent No.: US 12,652,622 B2
(45) Date of Patent: Jun. 9, 2026

(54) ADAPTIVE LOW-POWER CONSUMPTION METHOD, DEVICE, AND MEDIUM ACCESS CONTROL (MAC) LAYER FOR WIRELESS SENSOR NETWORKS

(71) Applicant: HUZHOU COLLEGE, Huzhou City (CN)

(72) Inventors: Zhiqun Wang, Huzhou City (CN); Bo Zhang, Huzhou City (CN); Minghe Zhu, Huzhou City (CN); Zikai Jin, Huzhou City (CN); Zhen Yang, Huzhou City (CN); Wenchao Zhao, Huzhou City (CN)

(73) Assignee: HUZHOU COLLEGE, Huzhou City (CN)

( * ) Notice: Subject to any disclaimer, the term of this patent is extended or adjusted under 35 U.S.C. 154(b) by 311 days.

(21) Appl. No.: 18/407,495

(22) Filed: Jan. 9, 2024

(65) Prior Publication Data

US 2025/0081115 A1     Mar. 6, 2025

(30) Foreign Application Priority Data

Sep. 4, 2023    (CN) .......................... 202311129208.9

(51) Int. Cl.
H04W 52/02        (2009.01)
H04W 84/18        (2009.01)
(52) U.S. Cl.
CPC ........ H04W 52/0287 (2013.01); H04W 84/18 (2013.01)

(58) Field of Classification Search
CPC ............. H04W 52/0287; H04W 84/18; H04W 52/0216; H04W 52/0261; H04W 52/0225; Y02D 30/70
See application file for complete search history.

(56) References Cited

U.S. PATENT DOCUMENTS

2018/0115879 A1 *   4/2018   Lindqvist .......... H04W 52/0216
2022/0408369 A1 *   12/2022   Cui ..................... H04W 52/146

* cited by examiner

*Primary Examiner* — Kyaw Z Soe
(74) *Attorney, Agent, or Firm* — WPAT, PC

(57) ABSTRACT

This invention discloses an adaptive low-power method, device, and medium for the MAC layer of a wireless sensor network. The method includes: determining the environmental traffic based on the number of packets sent and received by nodes within a set timeframe; obtaining the remaining battery energy percentage; establishing the average node frequency based on the power of all nodes; setting the maximum duty cycle frequency ($RDC_{max}$) and minimum duty cycle frequency ($RDC_{min}$). When the remaining battery energy percentage is above 50%, adjusting the current duty cycle frequency based on the environmental traffic; when the remaining battery energy percentage is approximately 20% to 50%, reducing the maximum duty cycle frequency ($RDC_{max}$) to limit the maximum change in duty cycle frequency while adjusting the current duty cycle frequency based on environmental traffic.

10 Claims, 9 Drawing Sheets

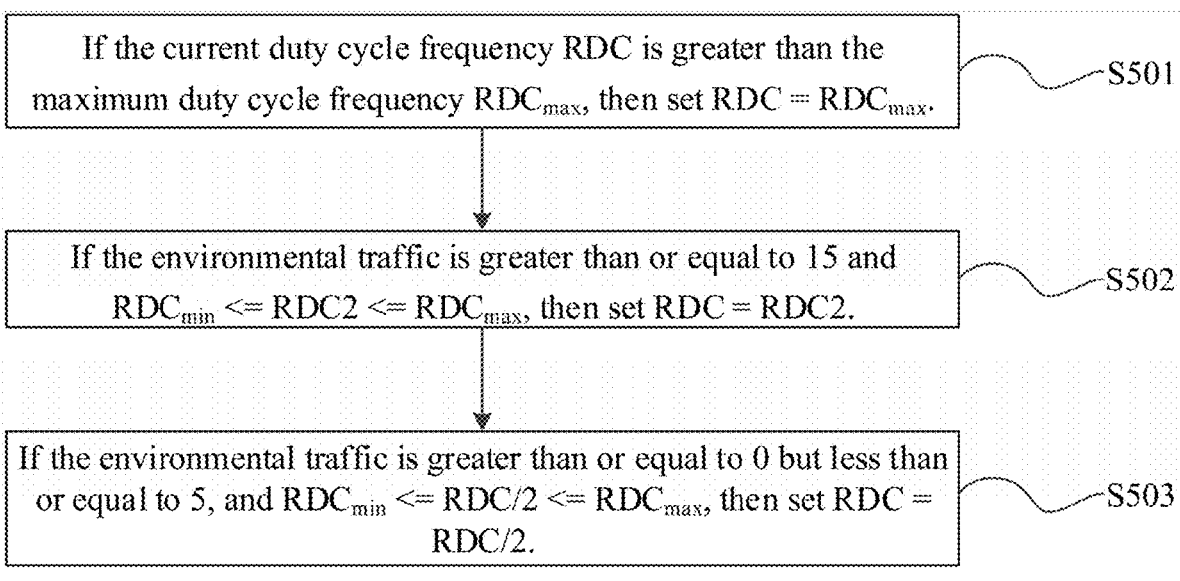

If the current duty cycle frequency RDC is greater than the maximum duty cycle frequency $RDC_{max}$, then set RDC = $RDC_{max}$. — S501

If the environmental traffic is greater than or equal to 15 and $RDC_{min}$ <= RDC2 <= $RDC_{max}$, then set RDC = RDC2. — S502

If the environmental traffic is greater than or equal to 0 but less than or equal to 5, and $RDC_{min}$ <= RDC/2 <= $RDC_{max}$, then set RDC = RDC/2. — S503

Figure 5

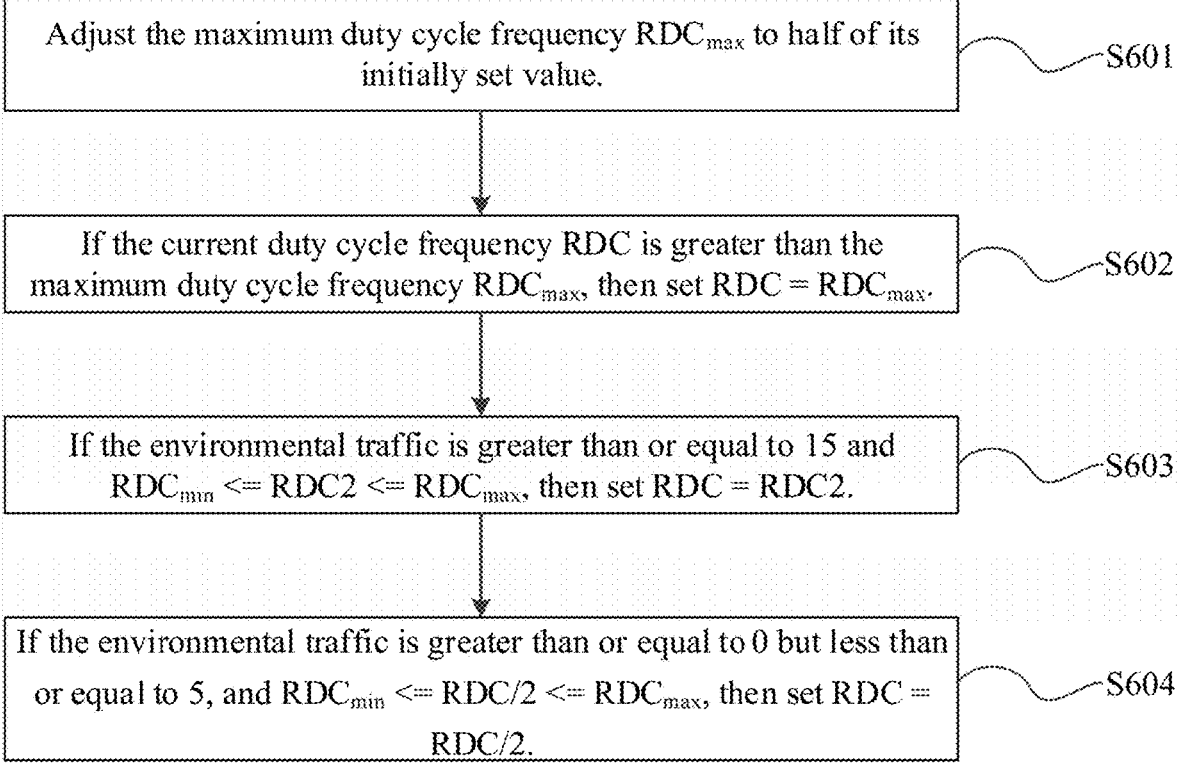

Adjust the maximum duty cycle frequency $RDC_{max}$ to half of its initially set value. — S601

If the current duty cycle frequency RDC is greater than the maximum duty cycle frequency $RDC_{max}$, then set RDC = $RDC_{max}$. — S602

If the environmental traffic is greater than or equal to 15 and $RDC_{min}$ <= RDC2 <= $RDC_{max}$, then set RDC = RDC2. — S603

If the environmental traffic is greater than or equal to 0 but less than or equal to 5, and $RDC_{min}$ <= RDC/2 <= $RDC_{max}$, then set RDC = RDC/2. — S604

Figure 6

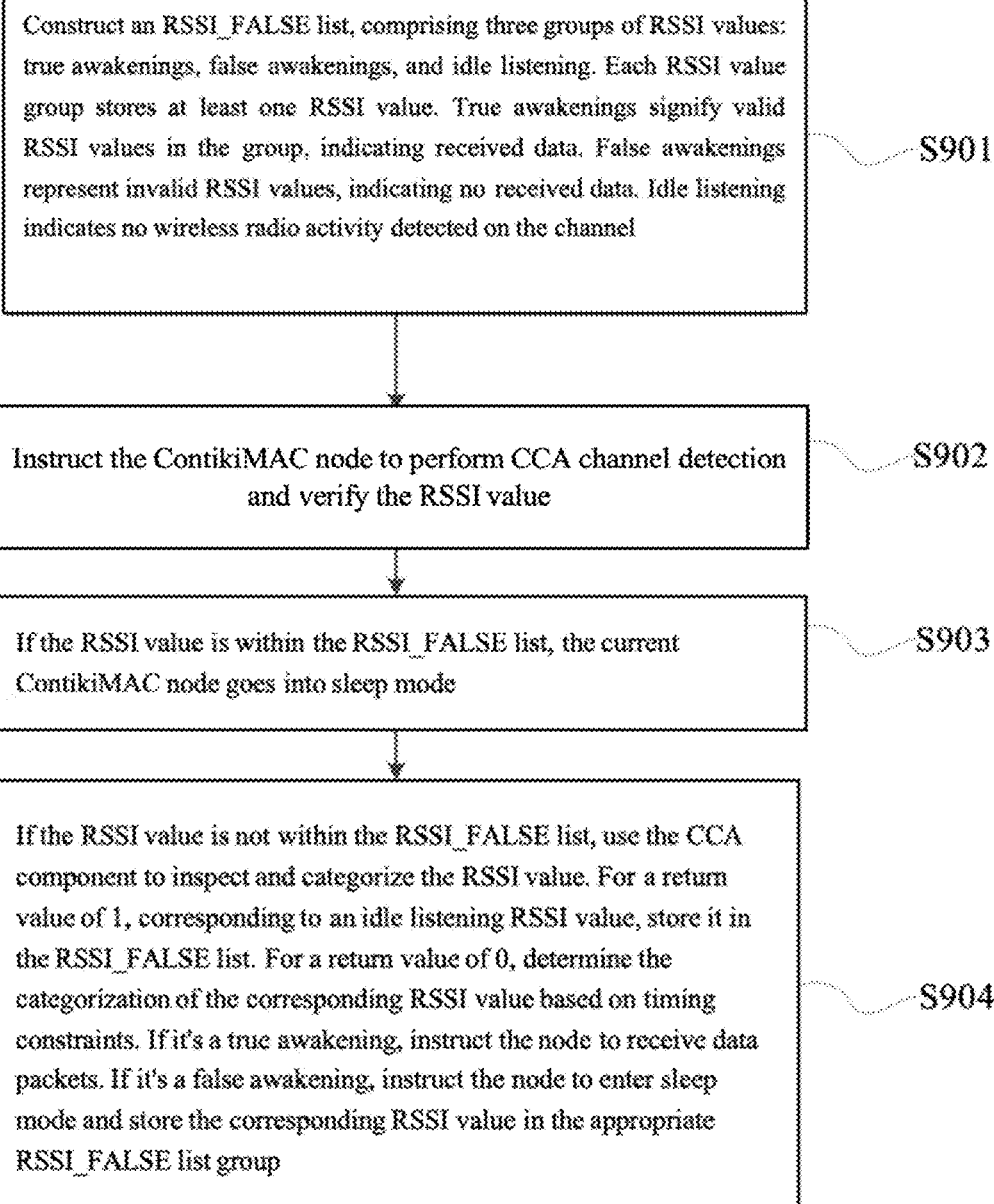

Construct an RSSI_FALSE list, comprising three groups of RSSI values: true awakenings, false awakenings, and idle listening. Each RSSI value group stores at least one RSSI value. True awakenings signify valid RSSI values in the group, indicating received data. False awakenings represent invalid RSSI values, indicating no received data. Idle listening indicates no wireless radio activity detected on the channel — S901

Instruct the ContikiMAC node to perform CCA channel detection and verify the RSSI value — S902

If the RSSI value is within the RSSI_FALSE list, the current ContikiMAC node goes into sleep mode — S903

If the RSSI value is not within the RSSI_FALSE list, use the CCA component to inspect and categorize the RSSI value. For a return value of 1, corresponding to an idle listening RSSI value, store it in the RSSI_FALSE list. For a return value of 0, determine the categorization of the corresponding RSSI value based on timing constraints. If it's a true awakening, instruct the node to receive data packets. If it's a false awakening, instruct the node to enter sleep mode and store the corresponding RSSI value in the appropriate RSSI_FALSE list group — S904

Figure 9

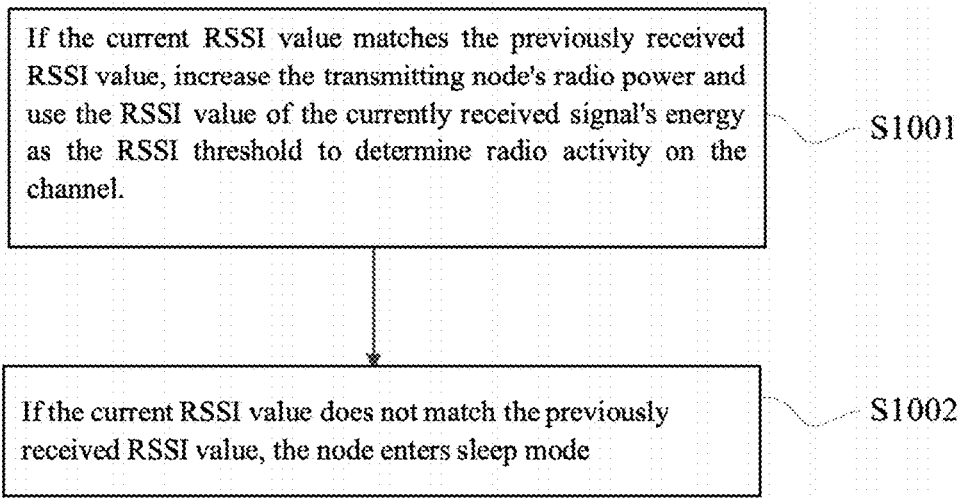

If the current RSSI value matches the previously received RSSI value, increase the transmitting node's radio power and use the RSSI value of the currently received signal's energy as the RSSI threshold to determine radio activity on the channel.  ⟍ S1001

If the current RSSI value does not match the previously received RSSI value, the node enters sleep mode  ⟍ S1002

Figure 10

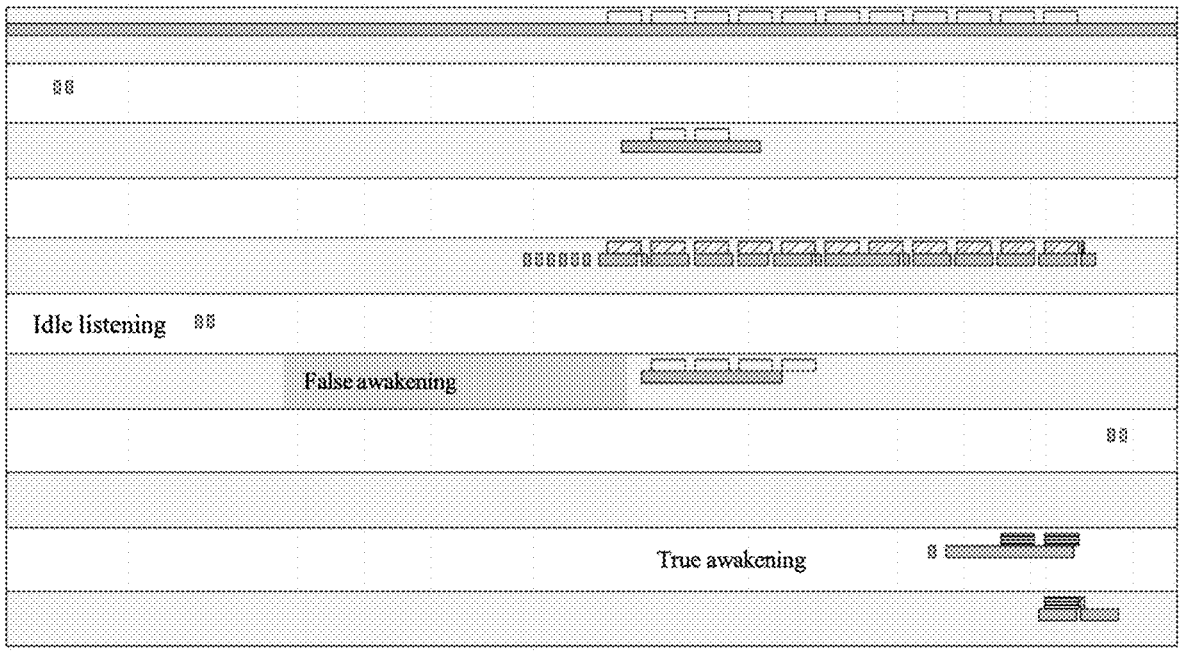

Idle listening

False awakening

True awakening

Processor
1301

Figure 13

ADAPTIVE LOW-POWER CONSUMPTION METHOD, DEVICE, AND MEDIUM ACCESS CONTROL (MAC) LAYER FOR WIRELESS SENSOR NETWORKS

TECHNICAL FIELD

This invention belongs to the field of wireless communication technology, specifically involving an adaptive low-power consumption method, device, and medium access control (MAC) layer for wireless sensor networks.

BACKGROUND

With the advancement of wireless communication technology, Wireless Sensor Networks (WSNs) have been widely applied in various fields such as defense, healthcare, industrial process monitoring and control, environmental observation, and smart homes. However, the energy carried by nodes in wireless sensor networks is limited, and issues related to node power supply, energy consumption, and network lifespan have been constant bottlenecks hindering the development and application of wireless sensor networks.

Medium Access Control (MAC) protocols reside in the data link layer of WSNs. Their primary function is to address the challenge of multiple nodes sharing a single channel within the network. They determine when and how nodes occupy the wireless channel for data transmission to prevent collisions among nodes during transmission. Due to the significant energy consumption by wireless modules, minimizing energy usage requires shutting down wireless transceivers as much as possible. However, nodes need to be awakened frequently to receive communication messages from neighboring nodes. To reduce idle listening, MAC protocols propose the Radio Duty Cycle (RDC) mechanism, which controls the wake-up period throughout the lifecycle of the MAC protocol, playing a crucial role in reducing energy consumption in sensor nodes. However, the RDC mechanism faces challenges in adapting to network load fluctuations and other network environment variations. Additionally, most WSN physical layers currently adopt the IEEE 802.15.4 specification, where MAC protocols typically use Clear Channel Assessment (CCA) for sensing the channel's status to avoid conflicts. However, the CCA mechanism cannot identify interference types during access, leading to issues like nodes being erroneously awakened due to signal interference.

SUMMARY

This invention aims to address the mentioned issues in existing technology. Therefore, there is a need for an adaptive low-power consumption method, device, and medium at the MAC layer of wireless sensor networks to reduce power consumption.

According to the first aspect of this invention, an adaptive low-power consumption method at the MAC layer of wireless sensor networks is provided. The method comprises:

Determining environmental traffic based on the number of packets sent and received by nodes within a specified time.

Obtaining the remaining battery energy percentage.

Determining the average node frequency based on the power of all nodes.

Setting the maximum duty cycle frequency, RDCmax, and the minimum duty cycle frequency, RDCmin.

Adjusting the current duty cycle frequency based on environmental traffic when the remaining battery energy percentage is above 50%.

When the remaining battery energy percentage is approximately 20% to 50%, reducing the maximum duty cycle frequency, RDCmax, to limit the maximum change in duty cycle frequency while adjusting the current duty cycle frequency based on environmental traffic.

When the remaining battery energy percentage is below 20%, determining the current duty cycle frequency based on the current node power and average node frequency.

Furthermore, determining environmental traffic based on the number of packets sent and/or received by nodes within a specified time involves:

Setting a time interval, 't', calculating the quantity of packets sent and/or received by nodes within 't', and obtaining the current environmental traffic information using the following formula:

$$T = \frac{N_{packets}}{t}$$

wherein, T represents the environmental traffic, $N_{packets}$ is the number of data packets sent and/or received by the node within t time.

Furthermore, the method of obtaining the remaining energy percentage of the battery specifically includes: calculate the energy consumed in a given time using the following formula;

$$E_{Node} = E_{TX} + E_{RX} + E_{CPU} + E_{LPM}$$

wherein, $E_{TX}$ represents energy consumption in the transmission (TX) mode, $E_{RX}$ represents energy consumption in the reception (RX) mode, $E_{CPU}$ represents energy consumption in the CPU mode, and $E_{LPM}$ represents energy consumption in the low-power mode (LPM). TX mode signifies the node being in packet transmission mode, RX mode indicates the node being in packet reception mode, CPU mode signifies the operational mode of the CPU when there's no sending or receiving of packets, and LPM mode represents the low-power mode;

the remaining battery energy percentage is calculated using the following formula:

$$B = \frac{E_{total} - E_{Node}}{E_{total}}$$

wherein, B represents the remaining energy percentage of the battery, and E represents the total energy of the battery.

Furthermore, when the remaining battery energy percentage is greater than 50%, adjusting the current duty cycle frequency based on the environmental traffic involves the following:

in the scenario where the remaining battery energy percentage exceeds 50%:

if the current duty cycle frequency (RDC) is greater than the maximum duty cycle frequency ($RDC_{max}$), set $RDC=RDC_{max}$;

if the environmental traffic is greater than or equal to 15 and $RDC_{min} \leq RDC*2 \leq RDC_{max}$, set $RDC=RDC*2$;

if the environmental traffic is greater than or equal to 0 but less than or equal to 5, and $RDC_{min} \leq RDC/2 \leq RDC_{max}$, set $RDC=RDC/2$.

Furthermore, when the remaining battery energy percentage is below 20%, the current duty cycle frequency is determined based on the power of the current node and the average node frequency, specifically including:

in cases where the remaining battery energy percentage is below 20%:

adjust the maximum duty cycle frequency $RDC_{max}$ to half of the initially set maximum duty cycle frequency;

if the current duty cycle frequency RDC is greater than the maximum duty cycle frequency $RDC_{max}$, set $RDC=RDC_{max}$;

if the power of the current node is greater than the average node frequency and $RDC_{min} \mathop{<}= RDC/2 \mathop{<}= RDC_{max}$, set $RDC=RDC/2$.

Further, the method further includes:

constructing an RSSI_FALSE list comprising three groups of RSSI values: positive wake-up, false wake-up, and idle listening, each group storing at least one RSSI value; the positive wake-up indicates valid RSSI values within the group, where data can be received; false wake-up indicates invalid RSSI values within the group, where data cannot be received; idle listening indicates no detection of any radio activity on the channel;

directing ContikiMAC nodes to perform CCA channel detection to validate RSSI values:

if the RSSI value is within the RSSI_FALSE list, the current ContikiMAC node goes into sleep mode;

if the RSSI value is not within the RSSI_FALSE list, the CCA component is used to check and classify RSSI values; if the return value is 1, the corresponding RSSI value belongs to idle listening and is stored in the RSSI_FALSE list; if the return value is 0, the corresponding RSSI value is classified based on a timing constraint; if it's a positive wake-up, the node receives the data packet; if it's a false wake-up, the node enters sleep mode, and the corresponding RSSI value is stored in the respective RSSI_FALSE list group.

Further, using the CCA component to check and classify RSSI values, if the return value is 1 indicating that the corresponding RSSI value belongs to idle listening, the method further includes: if the current RSSI value is the same as the previously received RSSI value, increase the wireless radio power of the transmitting node and consider the RSSI value of the currently received signal energy as the threshold for RSSI values; this RSSI value threshold is used to determine radio activity on the channel; if the current RSSI value is not the same as the previously received RSSI value, the node enters sleep mode.

This invention also provides a wireless sensor network MAC layer adaptive low-power device comprising a processor configured to:

determine environmental flow based on the number of data packets sent and received by nodes within a set time;

obtain the remaining battery energy percentage;

determine the average node frequency based on the power of all nodes;

set the maximum duty cycle frequency $RDC_{max}$ and minimum duty cycle frequency $RDC_{min}$;

adjust the current duty cycle frequency based on the environmental flow when the remaining battery energy percentage is above 50%;

when the remaining battery energy percentage is approximately greater than or equal to 20% and less than or equal to 50%, reduce the maximum duty cycle frequency $RDC_{max}$ to decrease the maximum value of duty cycle frequency variation; simultaneously, adjust the current duty cycle frequency based on the environmental flow;

when the remaining battery energy percentage is below 20%, determine the current duty cycle frequency based on the power of the current node and the average node frequency.

This invention provides another technology of a non-transitory computer-readable storage medium storing instructions, which is executed by a processor, performing the low-power adaptive method for the MAC layer of a wireless sensor network.

According to the wireless sensor network MAC layer adaptive low-power consumption method, device, and medium of various schemes of the present invention, it has at least the following technical effects:

The ContikiMAC protocol at the MAC layer adopts a fixed Radio Duty-Cycle (RDC) frequency, which cannot adapt to the changing environment of high and low traffic networks. The present invention can adaptively change the RDC frequency by considering the environment traffic, current battery level, and average node power. Simulation results show that in a network environment with varying loads, the improved protocol reduces the average duty cycle of the network, increases the average packet delivery rate, and reduces the end-to-end average delay, thereby enhancing the overall service quality of the network.

Addressing the issues of energy wastage and insufficient performance caused by the Clear Channel Assessment (CCA) component used in the ContikiMAC protocol at the MAC layer, the present invention constructs a novel CCA component that comprehensively considers changes in network environment, interference types, and other factors. It effectively reduces channel conflicts and decreases the percentage of idle listening and false awakenings in the radio duty cycle. Simulation results indicate that in a network environment with varying loads, the improved protocol reduces the average duty cycle of the network, increases the average packet delivery rate, and decreases the end-to-end average delay, thereby improving the overall service quality of the network.

BRIEF DESCRIPTION OF DRAWINGS

In the drawings, which are not necessarily to scale, the same reference numbers may describe similar components in the different views. The same reference number with a letter suffix or different letter suffixes may refer to different instances of similar components. The drawings illustrate various embodiments generally by way of example and not limitation, and together with the description and claims serve to explain embodiments of the invention. Where appropriate, the same reference numbers will be used throughout the drawings to refer to the same or similar parts. Such embodiments are illustrative and are not intended to be exhaustive or exclusive embodiments of the apparatus or method

FIG. 5 shows a flow chart of duty cycle frequency adjustment when the remaining energy percentage of the battery is greater than 50% according to an embodiment of the present invention;

FIG. 6 shows a duty cycle frequency adjustment flow chart when the remaining battery energy percentage is greater than or equal to 20% but less than or equal to 50% according to an embodiment of the present invention;

FIG. 9 shows a flow chart of improving the clear channel assessment component according to an embodiment of the present invention;

FIG. 10 shows an RSSI threshold adaptive adjustment flow chart according to an embodiment of the present invention;

FIG. 11 shows a schematic diagram of the Cooja emulator timeline according to an embodiment of the present invention;

FIG. 13 shows a structural diagram of a wireless sensor network MAC layer adaptive low-power consumption method according to an embodiment of the present invention.

DETAILED DESCRIPTION OF EMBODIMENTS

In order to enable those skilled in the art to better understand the technical solutions of the present invention, the present invention will be described in detail below with reference to the drawings and specific implementation modes. The embodiments of the present invention will be described in further detail below with reference to the accompanying drawings and specific examples, but this is not intended to limit the present invention. If the various steps described in this article are not necessarily related to each other, the order in which they are described as an example in this article should not be regarded as a limitation. Those skilled in the art will know that the order can be adjusted as long as As long as the logic between them is not destroyed and the entire process cannot be realized.

The embodiments of the present invention offer an adaptive low-power consumption method for the wireless sensor network MAC layer, innovatively designed to address the deficiencies of the existing ContikiMAC protocol.

Specifically, the ContikiMAC protocol utilizes a fixed default RDC frequency, yet the actual network environment is inherently unstable, with potential significant fluctuations in network loads. Under such circumstances, a fixed RDC frequency fails to meet the demands of the environment. This method constructs an improved protocol that can adaptively alter the RDC frequency by considering changes in environmental traffic, current battery levels, and average node power. By overcoming the energy wastage and performance insufficiency associated with a fixed RDC frequency, this method effectively enhances network energy consumption performance and extends the network's lifecycle.

Figure 1:
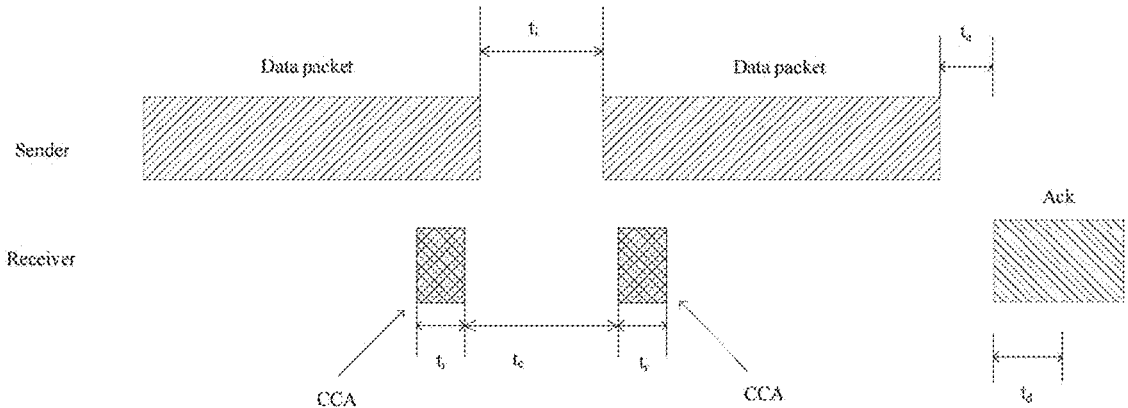
FIG. 1 shows a ContikiMAC transmission cycle diagram according to an embodiment of the present invention.

Operation mechanism of ContikiMAC protocol: FIG. 1 illustrates a transmission cycle diagram of the ContikiMAC protocol. In this illustration, ti represents the time interval between two data packets, tr signifies the time taken for a single CCA component detection, tc stands for the time interval between two CCA component detections, ta denotes the time interval from receiving a complete data packet to sending an ACK confirmation, td indicates the time taken for a receiving node to successfully detect an ACK confirmation, and ts represents the time taken to transmit a data packet.

Strict time division: Firstly, to ensure that the first or second CCA component can perceive the data packet, ti must be smaller than tc. Secondly, for the ContikiMAC protocol to detect two CCAs for a data packet, the data packet transmission duration cannot be so short as to fall between CCAs; hence, ensuring tc+2tr<ts is necessary. Finally, ta+td becomes the lower limit of ti time to ensure packet transmission, ultimately resulting in ta+td<ti<tc<tc+2tr<ts.

Figure 2:
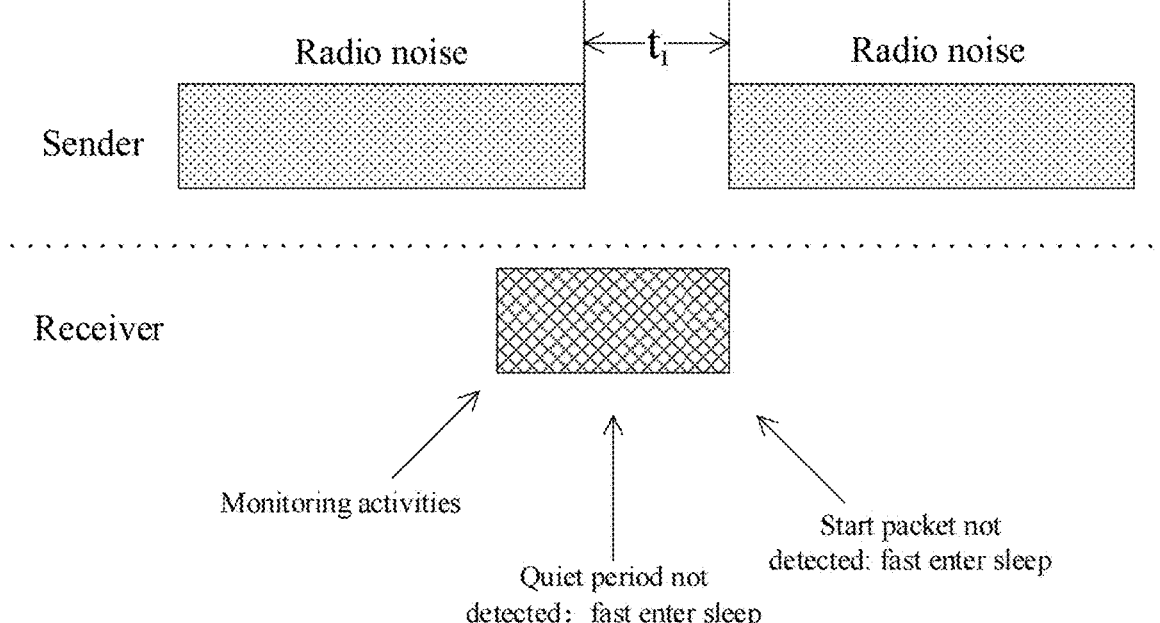
FIG. 2 shows a schematic diagram of a fast sleep mechanism according to an embodiment of the present invention.

Fast sleep mechanism as shown in FIG. 2: Due to the unreliable nature of CCA in discerning genuine wake-ups (nodes receiving data packets) from false wake-ups (noise or interference), the fast sleep mechanism allows the receiving node to enter sleep mode earlier upon detecting a false wake-up. If the duration of continuous wireless activity detected by CCA exceeds the maximum packet length, it indicates CCA has detected noise, prompting the node to return to sleep. If the quiet period exceeds ti, the receiver will return to sleep state. Even if radio activity is detected after the quiet period without receiving a data packet, the receiver will return to sleep state.

Figure 3:
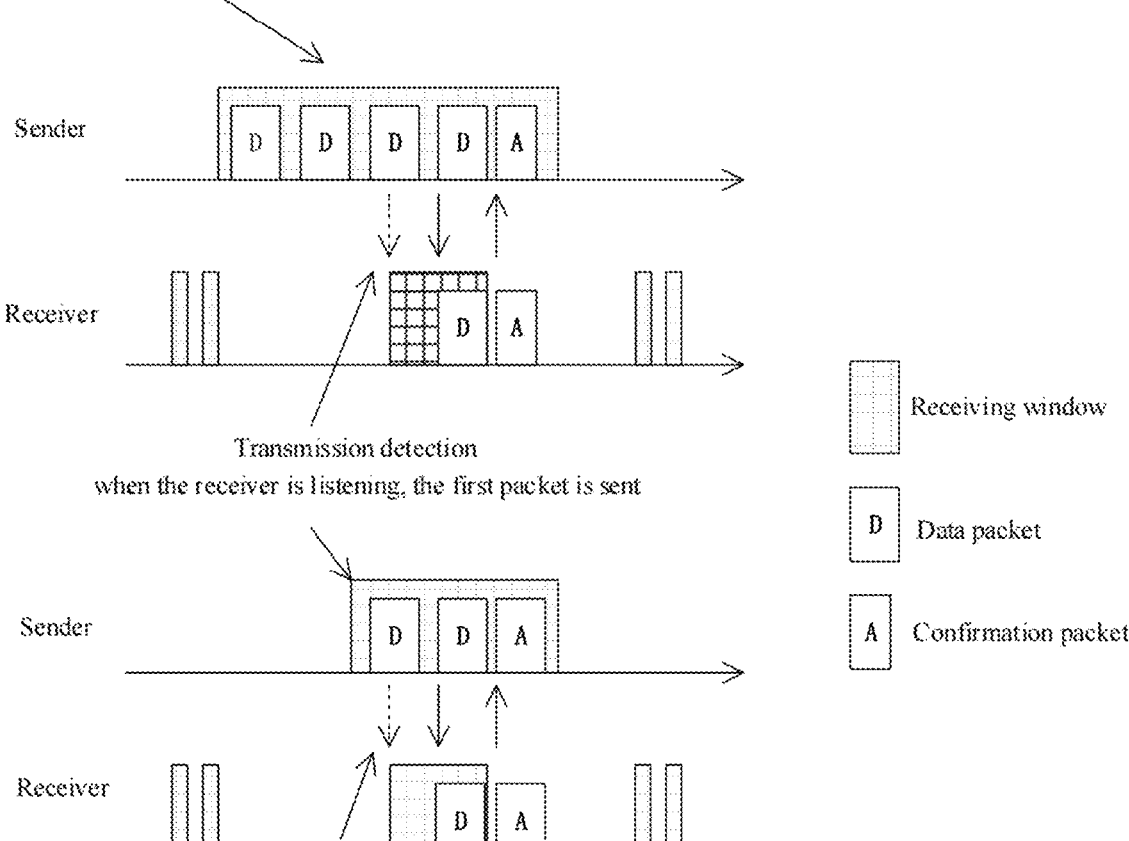
FIG. 3 shows a schematic diagram of the lock time optimization mechanism according to an embodiment of the present invention.

The phase-locked optimization mechanism, as shown in FIG. 3, assumes that the wake-up intervals for each receiver are periodic and stable. Using this information, the sender can optimize its transmission process based on the receiver's wake-up phase. The sender can record the phase-locking information attached to the ACK confirmation returned from the receiver to determine the receiver's wake-up cycle time. As the receiver must be awake to receive data packets, nodes can learn about neighboring wake-up phases after the initial transmission. Once a node receives confirmation, it knows the destination is awake at that time. Using this as a reference, the sender can shorten the transmission process. The phase-locking mechanism allows the sender to initiate its continuous data transmission a short time before the destination wakes up, reducing the time and energy spent in transmission mode.

Shortcomings of the ContikiMAC protocol: RDC controls the wake-up cycle of sensor nodes throughout their entire lifecycle, effectively reducing idle listening and playing a significant role in conserving sensor energy. ContikiMAC is an asynchronous duty-cycle mechanism based on the periodic wake-up of network nodes, maintaining a static wake-up frequency throughout the network lifecycle. This mechanism does not require signaling messages or additional headers to determine node wake-up and sleep cycles. However, ContikiMAC employs a default fixed RDC frequency, which might result in longer data packet delivery delays, lower network capacity, and reduced energy efficiency. This becomes particularly evident in applications with frequent communication where the actual network environment is unstable and network loads fluctuate significantly. A fixed RDC frequency cannot adapt to these environmental demands. Hence, an adaptive RDC-ContikiMAC protocol needs to be designed to address these issues by considering changes in network environment factors such as traffic, battery levels, and node power consumption.

Considering the mechanisms and shortcomings of ContikiMAC as described above, a fixed RDC frequency in ContikiMAC struggles to adapt to the highly variable, complex, and unstable real-world network environments. During sudden traffic bursts, a fixed RDC frequency leads to a surge in packet collisions among nodes, resulting in incomplete packet reception and subsequent retransmissions. In low-load network environments where there's limited communication and data exchange, the fixed RDC frequency still causes nodes to wake up at regular intervals, leading to energy waste. Nodes in WSNs are battery-powered, and operating nodes at a fixed RDC frequency with low battery levels shortens the entire network's lifespan. Additionally, restricting the RDC frequency of high-power nodes, without significantly affecting the network's functionality, is beneficial for prolonging the network's lifespan during its operation.

Figure 4:
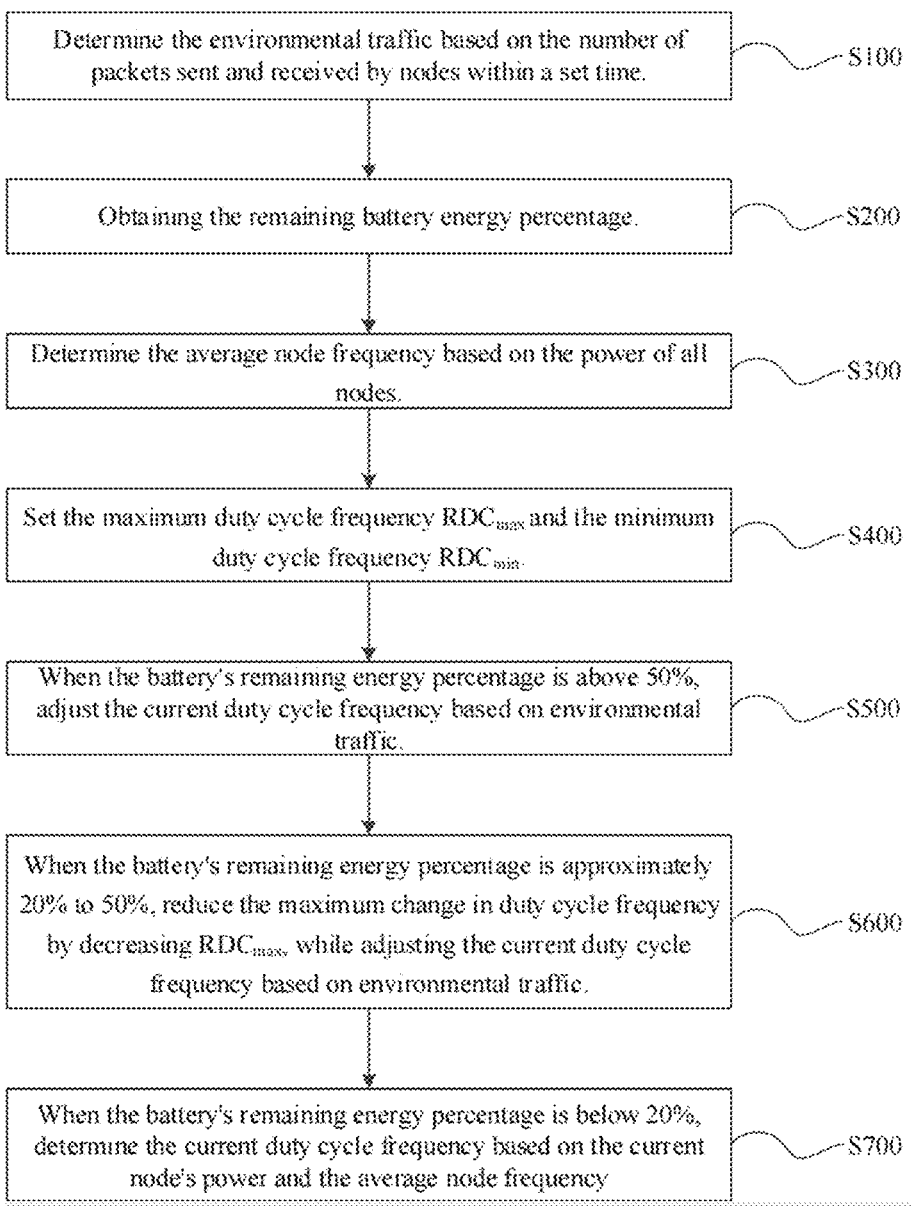
FIG. 4 shows a flow chart of a wireless sensor network MAC layer adaptive low-power consumption method according to an embodiment of the present invention.

Therefore, the embodiment of the present invention proposes an adaptive low-power method for the MAC layer of a wireless sensor network, as shown in FIG. 4. The method includes the following steps: Step S100: Determine the environmental traffic based on the number of packets sent and received by nodes within a set time. Environmental traffic represents the frequency of packet transmission between nodes. By analyzing the number of packets sent and received by nodes within a period, the speed of environmental traffic can be largely inferred. Hence, utilizing the timer function within the Contiki system, a time period 't' is set, typically to one minute. During this period, the quantity of packets sent or received by nodes is calculated to obtain current environmental traffic information, as per the following formula:

$$T = \frac{N_{packets}}{t}$$

wherein, T represents the environmental traffic, $N_{packets}$ is the number of data packets sent and/or received by the node within t time.

Step S200 involves obtaining the remaining battery energy percentage.

Within the Contiki system, analyzing a node's energy consumption typically considers TX mode, RX mode, CPU mode, and LPM mode. TX mode indicates the node is in packet transmission mode, RX mode indicates the node is in packet reception mode, CPU mode signifies the CPU's operation when there's no sending or receiving of packets, and LPM mode denotes low-power mode. These four modes are mutually exclusive, with nodes operating in only one mode at a time. Therefore, the formula for energy consumption by a node within a given period can be expressed as follows:

$$E_{Node} = E_{TX} + E_{RX} + E_{CPU} + E_{LPM}$$

wherein, ETX represents energy consumption in the transmission (TX) mode, ERX represents energy consumption in the reception (RX) mode, ECPU represents energy consumption in the CPU mode, and ELPM represents energy consumption in the low-power mode (LPM);

Use the Energest module to get the clock cycles in the four modes. If you want to get the number of seconds, you need to use the constant RTIMER_SECOND=32768 to remove the number of clock cycles:

TX=energest_type_time(ENERGEST_TYPE_TRANSMIT);
RX=energest_type_time(ENERGEST_TYPE_LISTEN);
CPU=energest_type_time(ENERGEST_TYPE_CPU);
LPM=energest_type_time(ENERGEST_TYPE_LPM);

Therefore, the energy consumption formula within a given time period can be transformed into the following:

$$E_{Node} = \frac{(TX * I_{TX} + RX * I_{RX} + CPU * I_{CPU} + LPM + I_{LPM}) * \text{Voltage}}{\text{RTIMER\_SECOND}}$$

The parameters of T-motesky type nodes are shown in Table 1 below:

TABLE 1

| Parameter list of T-motesky type node | | | |
|---|---|---|---|
| Parameter | Status | Value | Unit |
| TX Mode1 | MCU on, Radio TX | 19.5 | mA |
| RX Mode1 | MCU on, Radio RX | 21.8 | mA |
| CPU Mode1 | MCU on, Radio off | 1.8 | mA |
| LPM Mode1 | MCU in sleep, Radio off | 0.054 | mA |
| Voltage | | 3 | V |

After calculating the energy consumed by the battery over a period of time, you also need to calculate the remaining energy percentage of the battery, as shown below:

$$B = \frac{E_{total} - E_{Node}}{E_{total}}$$

In the formula, B represents the remaining battery energy percentage, and E represents the total energy of the battery.

Step S300: Determine the average node frequency based on the power of all nodes.

In a distributed wireless sensor network, the power P of each node is monitored and recorded regularly, then transmitted to the aggregation node in the sensing data packets. The average power P1 is calculated from all nodes' powers, and this value P1 is disseminated to all nodes through a routing protocol. Nodes with power higher than the average P1 will subsequently reduce their Radio Duty Cycle (RDC) frequency.

Step S400: Set the maximum duty cycle frequency $RDC_{max}$ and the minimum duty cycle frequency $RDC_{min}$.

Step S500: When the battery's remaining energy percentage is above 50%, adjust the current duty cycle frequency based on environmental traffic.

In some embodiments, as shown in FIG. 5, step S500 specifically includes:

Sub-step S501: If the current duty cycle frequency RDC is greater than the maximum duty cycle frequency $RDC_{max}$, then set RDC=$RDC_{max}$.

Sub-step S502: If the environmental traffic is greater than or equal to 15 and $RDC_{min}<=RDC2<=RDC_{max}$, then set RDC=RDC2.

Sub-step S503: If the environmental traffic is greater than or equal to 0 but less than or equal to 5, and $RDC_{min}<=RDC/2<=RDC_{max}$, then set RDC=RDC/2.

Step S600: When the battery's remaining energy percentage is approximately 20% to 50%, reduce the maximum change in duty cycle frequency by decreasing $RDC_{max}$, while adjusting the current duty cycle frequency based on environmental traffic.

In some embodiments, as shown in FIG. 6, step S600 specifically includes:

Sub-step S601: Adjust the maximum duty cycle frequency $RDC_{max}$ to half of its initially set value.

Sub-step S602: If the current duty cycle frequency RDC is greater than the maximum duty cycle frequency $RDC_{max}$, then set RDC=$RDC_{max}$.

Sub-step S603: If the environmental traffic is greater than or equal to 15 and $RDC_{min}<=RDC2<=RDC_{max}$, then set RDC=RDC2.

Sub-step S604: If the environmental traffic is greater than or equal to 0 but less than or equal to 5, and $RDC_{min}<=RDC/2<=RDC_{max}$, then set RDC=RDC/2.

Figure 7:
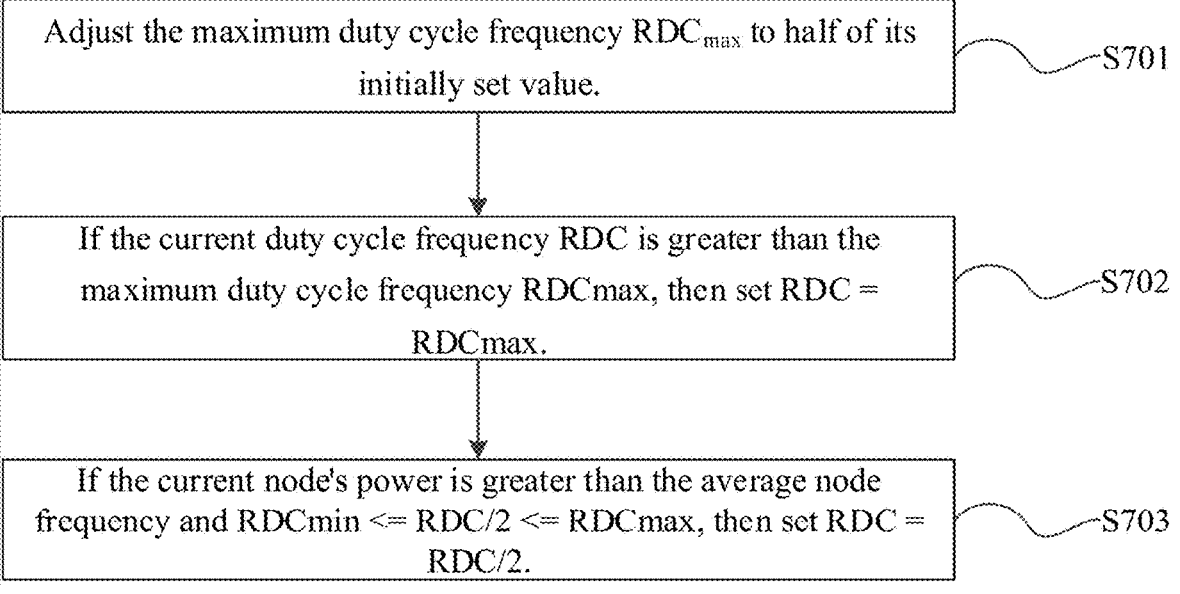
FIG. 7 shows a duty cycle frequency adjustment flow chart when the remaining energy percentage of the battery is less than 20% according to an embodiment of the present invention.

Step S700: When the battery's remaining energy percentage is below 20%, determine the current duty cycle frequency based on the current node's power and the average node frequency In some embodiments, as shown in FIG. 7, step S700 specifically includes:

Sub-step S701: Adjust the maximum duty cycle frequency $RDC_{max}$ to half of its initially set value.

Sub-step S702: If the current duty cycle frequency RDC is greater than the maximum duty cycle frequency RDC max, then set RDC=RDCmax.

Sub-step S703: If the current node's power is greater than the average node frequency and RDCmin<=RDC/2<=RDCmax, then set RDC=RDC/2

In some embodiments, steps S400 to S700 as described above can be specifically implemented as an adaptive dynamic radio duty cycle (RDC) algorithm. After computing the battery's remaining energy percentage B, environmental traffic T, and the average power P1 of all nodes, and setting RDCmin and RDCmax to reasonably limit the range of RDC variations, preventing them from being excessively large or small, which might affect the overall network performance. Simultaneously, tailored strategies are employed for different node battery levels. When the battery level exceeds 50%, the node's RDC frequency changes adaptively based on environmental traffic. When the battery level is between 20% and 50%, by constraining RDCmax, the maximum change in RDC frequency is reduced while still adapting the overall node RDC frequency based on environmental traffic. When the battery is below 20%, considering the limited battery capacity, RDC frequency isn't controlled based on adaptive environmental traffic but follows an average node power strategy. This involves computing the actual node power and appropriately reducing the RDC frequency of high-power nodes, sacrificing a small portion of network performance to extend the network's lifespan. The interval for updating RDC frequency is set at 3 minutes. The implementation process is as follows:

Initialization: RDCmin=8, RDCmax=64, RDC=32;
Input: Battery's remaining energy percentage B, environmental traffic T, average power P1 of all nodes;

```
Output: Adaptive RDC value.
BEGIN;
if(B>50%)then
RDCmin=8,RDCmax=64;
if(RDC>RDCmax)then
RDC=RDCmax;
end
if(T>=15&&RDCmin<=RDC*2<=RDCmax)then
RDC=RDC*2;
end
if(0<=T<=5&&RDCmin<=RDC/2<=RDCmax)then
RDC=RDC/2;
end
end
if(20%<=B<=50%)then
RDCmin=8,RDCmax=32;
if(RDC>RDCmax)then
RDC=RDCmax;
end
if(T>=15&&RDCmin<=RDC*2<=RDCmax)then
RDC=RDC*2;
end
if(0<=T<=5&&RDCmin<=RDC/2<=RDCmax)then
RDC=RDC/2;
end
end
if(0%<B<20%)then
RDCmin=8,RDCmax=32;
if(RDC>RDCmax)then
RDC=RDCmax;
end
if(P>P1&&RDCmin<=RDC/2<=RDCmax)then
RDC=RDC/2;
end
end
END.
```

The algorithm mentioned above utilizes a default RDC frequency of 32 Hz. Through experiments, it was found that setting it to 8 Hz results in longer sleep-wake intervals, while at 64 Hz, the intervals become very short, both scenarios being unfavorable for experimentation. At 32 Hz, optimal performance was observed across various aspects.

The enhanced ContikiMAC protocol dynamically adjusts the RDC value based on changes in environmental traffic, battery levels, and average node power. This adaptation allows it to accommodate network variations, thereby enhancing the overall service quality.

As described, it initially outlines the operational mechanism and shortcomings of the ContikiMAC protocol. It then elaborates on the design proposal for the improved protocol, presenting the algorithmic process. Finally, experiments are conducted, and data analysis is performed. Simulation results indicate that this protocol, in a network environment with fluctuating loads, reduces the network's average duty cycle, increases the average packet delivery rate, and decreases end-to-end average latency. This enhancement improves the overall service quality by approximately 4.7%.

In this embodiment, the MAC layer's adaptive low-power method for the wireless sensor network addresses the limitations of the existing ContikiMAC protocol. The improvements aim to help ContikiMAC effectively reduce channel conflicts, minimize idle listening, and false awakenings in the radio duty cycle percentage. This enhancement overcomes the energy waste and performance shortcomings associated with default Clear Channel Assessment (CCA), thereby effectively enhancing the network's energy consumption performance.

The following will elaborate on the operational mechanism and shortcomings of the CCA component based on ContikiMAC.

The Clear Channel Assessment (CCA) component exists at the physical layer, reliably detecting ongoing transmissions, enabling sensor nodes to determine whether channel access is feasible. Based on the ContikiMAC protocol, during each sleep-wake cycle, the MAC layer measures the Received Signal Strength Indicator (RSSI) threshold through the Clear Channel Assessment (CCA) component to monitor the channel's state—idle or busy. Subsequently, the MAC layer decides whether to initiate a transmission or defer it for another cycle.

Figure 8:
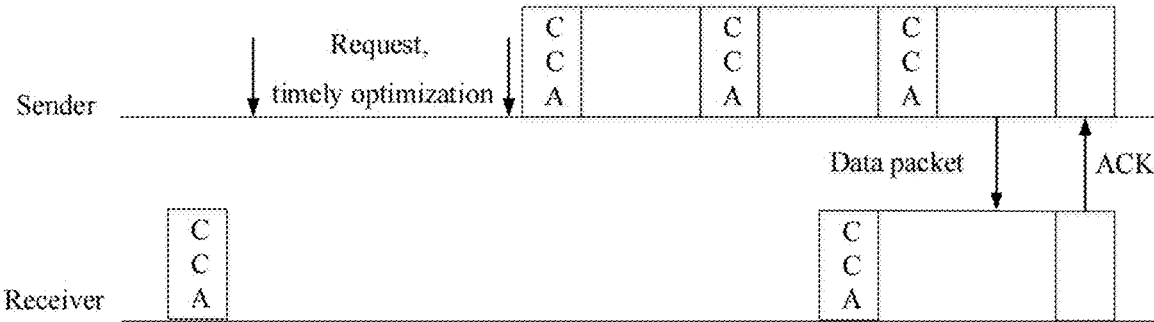
FIG. 8 shows a working process diagram of the Contiki-MAC protocol CCA according to an embodiment of the present invention.

The CCA component applies to both transmitting and receiving nodes. The receiving node employs two 0.5 ms intervals for CCA, checking the channel every 125 ms to determine if any node is transmitting data. If so, the receiving node continues to listen for subsequent data packets 12.5 ms later. Otherwise, it goes into sleep mode. During the receiving node's sleep state, the sending node continuously retransmits data packets until it receives an ACK confirmation or encounters a transmission conflict during CCA checks. The process is illustrated in FIG. 8.

ContikiMAC's CCA checks only measure channel energy, making it unable to differentiate between the sender and other interferences. Additionally, in congested environments, this ambiguity in ContikiMAC's design can decrease energy efficiency and link performance. The previously used CCA component lacks adaptive adjustments based on network environment changes, unable to distinguish interference types and respond appropriately to different interference types.

The channel status heavily relies on the link and can significantly fluctuate in high-traffic or severe interference scenarios. Numerous noise interferences might prevent some transmitted and received signals from being quickly identified, leading to reduced network service quality. The CCA component, similarly, cannot address this issue. In heavily interfered environments, interferences from coexisting networks or objects operating at the same frequency can substantially decrease the accuracy of CCA. The CCA check detecting such interference would mistakenly indicate to ContikiMAC protocol nodes to power up the radio to receive non-existent data packets, causing false awakenings and subsequently lowering network performance. This necessitates the design of a novel CCA-ContikiMAC protocol that comprehensively considers changes in network environment, interference types, and other factors.

As shown in FIG. 9, the adaptive low-power method at the MAC layer of this wireless sensor network also includes the following steps:

Step S901: Construct an RSSI_FALSE list, comprising three groups of RSSI values: true awakenings, false awakenings, and idle listening. Each RSSI value group stores at least one RSSI value. True awakenings signify valid RSSI values in the group, indicating received data. False awakenings represent invalid RSSI values, indicating no received data. Idle listening indicates no wireless radio activity detected on the channel.

Step S902: Instruct the ContikiMAC node to perform CCA channel detection and verify the RSSI value.

Step S903: If the RSSI value is within the RSSI_FALSE list, the current ContikiMAC node goes into sleep mode.

Step S904: If the RSSI value is not within the RSSI-_FALSE list, use the CCA component to inspect and categorize the RSSI value. For a return value of 1, corresponding to an idle listening RSSI value, store it in the RSSI_FALSE list. For a return value of 0, determine the categorization of the corresponding RSSI value based on timing constraints. If it's a true awakening, instruct the node to receive data packets. If it's a false awakening, instruct the node to enter sleep mode and store the corresponding RSSI value in the appropriate RSSI_FALSE list group.

In some embodiments, as depicted in FIG. 10, after using the CCA component to inspect and categorize the RSSI values, if a return value of 1 corresponds to an idle listening RSSI value, the method further includes:

Step S1001: If the current RSSI value matches the previously received RSSI value, increase the transmitting node's radio power and use the RSSI value of the currently received signal's energy as the RSSI threshold to determine radio activity on the channel.

Step S1002: If the current RSSI value does not match the previously received RSSI value, the node enters sleep mode.

Based on the described method steps, this embodiment of the invention can design a novel CCA-ContikiMAC protocol. Specifically, by executing CCA detection and analyzing the RSSI values detected by nodes, three categories are identified: the first category is "true wake-up," indicating valid RSSI values where the channel has minimal interference, allowing data reception; the second category is "false wake-up," denoting invalid RSSI values with higher noise interference on the channel, rendering data reception impossible; the third category is "idle listening," signifying no detected radio activity on the channel. An improved CCA algorithm stores false wake-up and idle listening RSSI values in an RSSI_FALSE list for further processing.

In FIG. 11, three states of wireless activity in Cooja are illustrated: idle listening, false wake-up, and true wake-up. The unfilled rectangles represent noise interference, diagonal rectangles indicate data packet transmission, and straight rectangles represent data packet reception.

Figure 12:
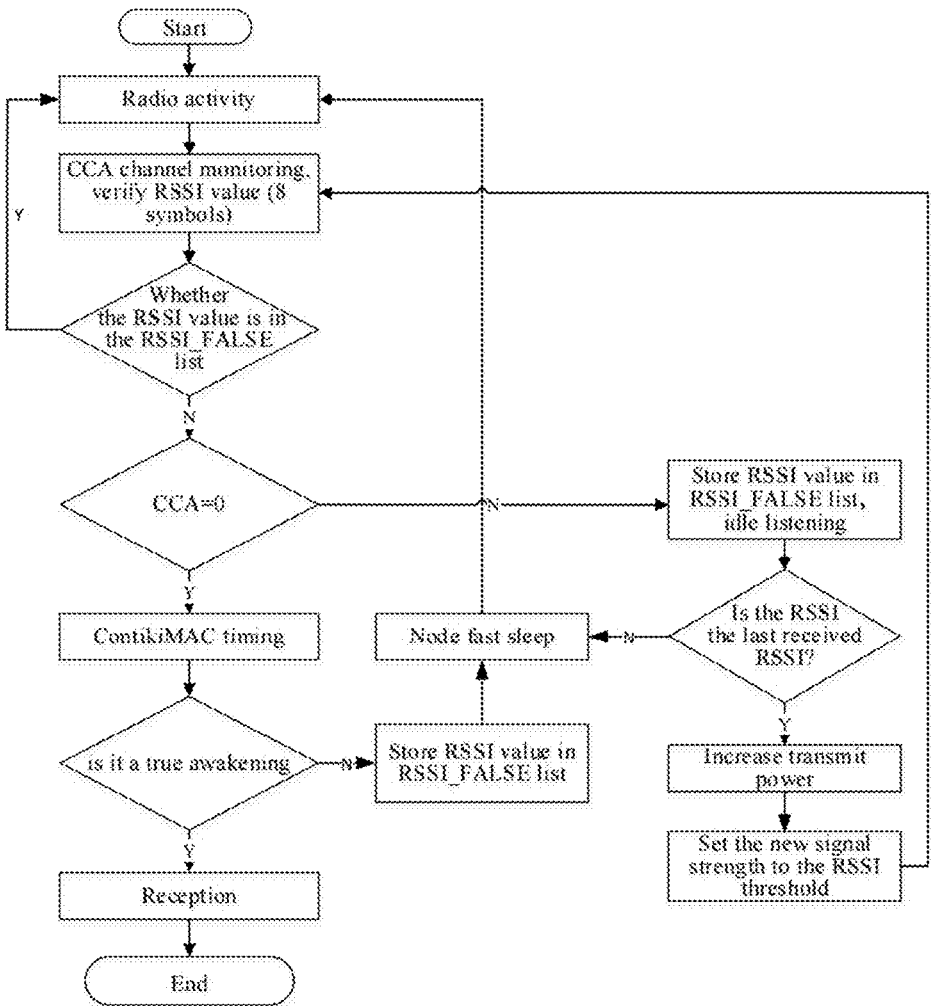
FIG. 12 shows a clear channel assessment component algorithm flow chart according to an embodiment of the present invention.

FIG. 12 provides a clear flowchart of the channel assessment component algorithm. In the improved channel assessment component, nodes use 8 symbols for CCA channel detection, verifying RSSI values. If the RSSI value exists in the RSSI_FALSE list, the node returns 1 and promptly enters a sleep state, thus significantly conserving energy. If the RSSI value does not exist in the RSSI_FALSE list, the ContikiMAC node applies CCA to check and categorize the RSSI value. If CCA returns a value of 1, the idle listening RSSI value is stored in the RSSI_FALSE list. If CCA returns a value of 0, based on the timing constraints of the ContikiMAC protocol, the node distinguishes between true and false wake-ups. Upon a true wake-up, the node receives the data packet, while a false wake-up stores the RSSI value in the RSSI_FALSE list, and the node enters a sleep state using a rapid sleep mechanism. This method of handling interference types minimizes the number of false wake-ups and idle listening detections by the radio, consequently reducing energy consumption during communication activities in transmit mode.

Simultaneously, this method aims to enhance the CCA component's detection capabilities under light and heavy interference, increase node transmission power, adaptively adjust the RSSI threshold above the noise interference floor, enabling faster detection of signals from transmitting nodes, reducing duty cycles, and conserving energy. When CCA returns a value of 1, the idle listening RSSI value is stored in the RSSI_FALSE list. Simultaneously, it checks if the RSSI value matches the previously received RSSI value. If it does, the node increases the radio power of the transmitting node by 6 dBm, setting the new signal's energy RSSI value as the threshold. If not, the node enters rapid sleep mode.

Therefore, this embodiment of the invention first introduces the working mechanism and shortcomings of the clear channel assessment component. It then details the design approach for the improved protocol, outlining the algorithm's design process, and concludes with experimentation and data analysis. Simulation results demonstrate that this protocol, in a network environment with varying loads, reduces the average network duty cycle, enhances average packet delivery rates, reduces end-to-end average latency, thereby improving the network's service quality by approximately 4.3%.

Figure 13:
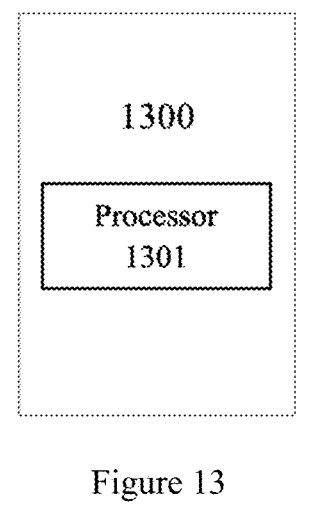

This embodiment of the invention also provides a device for an adaptive low-power MAC layer in a wireless sensor network. Please refer to FIG. 13, which illustrates the structural diagram of an adaptive low-power MAC layer device for a wireless sensor network according to this embodiment. The device 1300 comprises a processor 1301, which is configured to: determine environmental traffic based on the number of packets sent and received by nodes within a set time; acquire the remaining battery energy percentage; determine the average node frequency based on the power of all nodes; set maximum duty cycle frequency $RDC_{max}$ and minimum duty cycle frequency $RDC_{min}$. When the remaining battery energy percentage is above 50%, adjust the current duty cycle frequency based on environmental traffic; when the remaining battery energy percentage is approximately 20% to 50%, decrease the maximum duty cycle frequency $RDC_{max}$ to limit the maximum duty cycle frequency change while adjusting the current duty cycle frequency based on environmental traffic; when the remaining battery energy percentage is below 20%, determine the current duty cycle frequency based on the current node's power and the average node frequency.

In some embodiments, the processor 1301 is further configured to set a time 't', calculate the number of packets sent and/or received by nodes within time 't', and obtain the current environmental traffic information using the following formula:

$$T = \frac{N_{packets}}{t}$$

wherein, T represents the environmental traffic, $N_{packets}$ is the number of data packets sent and/or received by the node within t time.

In some embodiments, the processor 1301 is further configured to calculate the energy consumed within a given time through the following formula:

$$E_{Node} = E_{TX} + E_{RX} + E_{CPU} + E_{LPM}$$

wherein, ETX represents energy consumption in the transmission (TX) mode, ERX represents energy consumption in the reception (RX) mode, $E_{CPU}$ represents energy consumption in the CPU mode, and ELPM represents energy consumption in the low-power mode (LPM); TX mode signifies the node being in packet transmission mode, RX mode indicates the node being in packet reception mode, CPU mode signifies the operational mode of the CPU when there's no sending or receiving of packets, and LPM mode represents the low-power mode;

the remaining battery energy percentage is calculated using the following formula:

$$B = \frac{E_{total} - E_{Node}}{E_{total}}$$

wherein, B represents the remaining energy percentage of the battery, and E represents the total energy of the battery.

In some embodiments, the processor 1301 is further configured as follows:

When the remaining battery energy percentage is above 50%:

If the current duty cycle frequency RDC is greater than the maximum duty cycle frequency $RDC_{max}$, set $RDC=RDC_{max}$.

If the environmental traffic is greater than or equal to 15 and $RDC_{min}<=RDC*2<=RDC_{max}$, set $RDC=RDC*2$.

If the environmental traffic is greater than or equal to 0 but less than or equal to 5, and $RDC_{min}<=RDC/2<=RDC_{max}$, set $RDC=RDC/2$.

When the remaining battery energy percentage is approximately 20% to 50%:

Adjust the maximum duty cycle frequency $RDC_{max}$ to half of the initially set maximum duty cycle frequency.

If the current duty cycle frequency RDC is greater than the maximum duty cycle frequency $RDC_{max}$, set $RDC=RDC_{max}$.

If the environmental traffic is greater than or equal to 15 and $RDC_{min}<=RDC*2<=RDC_{max}$, set $RDC=RDC*2$.

If the environmental traffic is greater than or equal to 0 but less than or equal to 5, and $RDC_{min}<=RDC/2<=RDC_{max}$, set $RDC=RDC/2$.

When the remaining battery energy percentage is below 20%:

Adjust the maximum duty cycle frequency $RDC_{max}$ to half of the initially set maximum duty cycle frequency.

If the current duty cycle frequency RDC is greater than the maximum duty cycle frequency $RDC_{max}$, set $RDC=RDC_{max}$.

If the current node's power is greater than the average node frequency and $RDC_{min}<=RDC/2<=RDC_{max}$, set $RDC=RDC/2$.

In some instances, the processor 1301 is further configured to: Construct an RSSI_FALSE list comprising three groups of RSSI values: true wake-up, false wake-up, and idle listening. Each group stores at least one RSSI value; true wake-up denotes valid RSSI values within the group where data can be received; false wake-up indicates invalid RSSI values within the group, preventing data reception; idle listening signifies no detected radio activity on the channel; direct the ContikiMAC node to execute CCA channel detection and validate RSSI values: If the RSSI value is within the RSSI_FALSE list, the current ContikiMAC node enters sleep mode. If the RSSI value is not within the RSSI_FALSE list, utilize the CCA component to inspect and categorize RSSI values. If the return value is 1, representing an idle listening RSSI value, store it in the RSSI_FALSE list. If the return value is 0, based on timing constraints, determine the classification of the corresponding RSSI value. If it's a true wake-up, instruct the node to receive the data packet. If it's a false wake-up, direct the node to enter sleep mode and store the corresponding RSSI value in the respective RSSI value group within the RSSI_FALSE list.

In some embodiments, the processor 1301 is further configured to: if the current RSSI value is the last received RSSI value, increase the radio power of the sending node and change the energy of the currently received signal to the RSSI value. As a threshold of RSSI value, the threshold of RSSI value is used to determine whether there is radio activity on the channel; if the current RSSI value is not the last received RSSI value, the node enters a sleep state. It should be noted that the wireless sensor network MAC layer adaptive low-power device mentioned above belongs to the same technical concept as the previous method. It can solve the same technical problem and achieve the same technical effect, and will not be described again here.

Embodiments of the present invention also provide a non-transitory computer-readable medium storing instructions. When the instructions are executed by a processor, the method according to any embodiment of the present invention is performed.

Furthermore, while exemplary embodiments have been described herein, the scope thereof includes any and all implementations based on the invention with equivalent elements, modifications, omissions, combinations (e.g., cross-fertilization of various embodiments), adaptations, or changes example. Elements in the claims are to be construed broadly based on the language employed in the claims and are not limited to the examples described in this specification or during the practice of this application, which examples are to be construed as non-exclusive. It is intended that the specification and examples be considered as examples only, with a true scope and spirit being indicated by the following claims, along with their full scope of equivalents.

The above description is intended to be illustrative rather than restrictive. For example, the above examples (or one or more versions thereof) may be used in combination with each other. For example, other embodiments may be used by those of ordinary skill in the art upon reading the above description. Additionally, in the above detailed description, various features may be grouped together to simplify the invention. This should not be construed as an intention that an unclaimed feature of the invention is essential to any claim. Rather, inventive subject matter may lie in less than all features of a particular inventive embodiment. Thus, the following claims are hereby incorporated into the Detailed Description as examples or embodiments, with each claim standing on its own as a separate embodiment, and with it being contemplated that these embodiments may be combined with one another in various combinations or permutations. The scope of the invention should be determined with reference to the appended claims, along with the full scope of equivalents to which such claims are entitled.

What is claimed is:

1. A low-power adaptive method for a medium access control (MAC) layer of a wireless sensor network, comprising:

determining an environmental traffic based on a number of data packets sent and received by nodes within a specified time;

obtaining a remaining battery energy percentage;

determining an average node frequency based on a power of the nodes;

setting a maximum duty cycle frequency $RDC_{max}$ and a minimum duty cycle frequency $RDC_{min}$;

when the remaining battery energy percentage is above 50%, adjusting a current duty cycle frequency based on the environmental traffic;

when the remaining battery energy percentage is approximately 20% to 50%, reducing the maximum duty cycle frequency $RDC_{max}$ to decrease a maximum change in duty cycle frequency, while simultaneously adjusting the current duty cycle frequency based on the environmental traffic;

when the remaining battery energy percentage is below 20%, determining the current duty cycle frequency based on a power of a current node and the average node frequency;

wherein, the obtaining a remaining battery energy percentage specifically includes:

calculating an energy consumed in a given time based on the following formula:

$$E_{Node} = E_{TX} + E_{RX} + E_{CPU} + E_{LPM}$$

wherein, $E_{TX}$ represents energy consumption in a transmission (TX) mode, $E_{RX}$ represents energy consumption in a reception (RX) mode, $E_{CPU}$ represents energy consumption in a central processing unit (CPU) mode, and $E_{LPM}$ represents energy consumption in a low-power mode (LPM); the TX mode signifies a node being in a packet transmission mode, the RX mode indicates the node being in a packet reception mode, the CPU mode signifies an operational mode of a CPU when there's no sending or receiving of packets, and the LPM mode represents the low-power mode; and calculating the remaining battery energy percentage based on the following formula:

$$B = \frac{E_{total} - E_{Node}}{E_{total}}$$

wherein, B represents the remaining battery energy percentage, and $E_{total}$ represents a total battery energy.

2. The method, as claimed in claim 1, wherein, the determining an environmental traffic based on a number of packets sent and received by nodes within a specified time includes:

setting the specified time t and calculating the number of the data packets sent and received by the nodes within the specified time t; a formula to obtain the environmental traffic is as follows:

$$T = \frac{N_{packets}}{t}$$

wherein, T represents the environmental traffic, $N_{packets}$ is the number of the data packets sent and received by the nodes within the specified time t.

3. The method, as claimed in claim 1, wherein, when the remaining battery energy percentage is above 50%, adjusting the current duty cycle frequency based on the environmental traffic involves the following:

in a scenario where the remaining battery energy percentage exceeds 50%:

if the current duty cycle frequency RDC is greater than the maximum duty cycle frequency $RDC_{max}$, setting $RDC=RDC_{max}$;

if the environmental traffic is greater than or equal to 15 and $RDC_{min} \leq RDC*2 \leq RDC_{max}$, setting $RDC=RDC*2$;

if the environmental traffic is greater than or equal to 0 but less than or equal to 5, and $RDC_{min} \leq RDC/2 \leq RDC_{max}$, setting $RDC=RDC/2$.

4. The method, as claimed in claim 1, wherein, when the remaining battery energy percentage is approximately 20% to 50%, reducing the maximum duty cycle frequency $RDC_{max}$ to decrease the maximum change in duty cycle frequency, while simultaneously adjusting the current duty cycle frequency based on the environmental traffic, specifically includes:

in cases where the remaining battery energy percentage is approximately greater than or equal to 20% and less than or equal to 50%:

adjusting the maximum duty cycle frequency $RDC_{max}$ to half of an initially set maximum duty cycle frequency;

if the current duty cycle frequency RDC is greater than the maximum duty cycle frequency $RDC_{max}$, setting $RDC=RDC_{max}$;

if the environmental traffic is greater than or equal to 15 and $RDC_{min}<=RDC*2<=RDC_{max}$, setting $RDC=RDC*2$;

if the environmental traffic is greater than or equal to 0 but less than or equal to 5, and $RDC_{min}<=RDC/2<=RDC_{max}$, setting $RDC=RDC/2$.

5. The method, as claimed in claim 1, wherein, when the remaining battery energy percentage is below 20%, determining the current duty cycle frequency based on the power of the current node and the average node frequency, specifically includes:

in cases where the remaining battery energy percentage is below 20%:

adjusting the maximum duty cycle frequency $RDC_{max}$ to half of an initially set maximum duty cycle frequency;

if the current duty cycle frequency RDC is greater than the maximum duty cycle frequency $RDC_{max}$, setting $RDC=RDC_{max}$;

if the power of the current node is greater than the average node frequency and $RDC_{min}<=RDC/2<=RDC_{max}$, setting $RDC=RDC/2$.

6. The method, as claimed in claim 1, wherein, the method further includes:

constructing a received signal strength indicator false (RSSI_FALSE) list comprising three groups of received signal strength indicator (RSSI) values: positive wake-up, false wake-up, and idle listening, each group of RSSI values storing at least one RSSI value; the positive wake-up indicates valid RSSI values within the group of RSSI values, where data is capable of being received; the false wake-up indicates invalid RSSI values within the group of RSSI values, where data is not capable of being received; and the idle listening indicates no detection of any radio activity on a channel;

directing a ContikiMAC node to perform clear channel assessment (CCA) channel detection to validate a RSSI value:

if the RSSI value is within the RSSI_FALSE list, enabling the ContikiMAC node to go into a sleep mode;

if the RSSI value is not within the RSSI_FALSE list, using a CCA component to check and classify the RSSI value; if a return value is 1, determining that the RSSI value belongs to idle listening and storing the RSSI value in the RSSI_FALSE list; if the return value is 0, determing a classification of the RSSI value based on a timing constraint; if the classification of the RSSI value is the positive wake-up, receiving, by the ContikiMAC node, receives a data packet; if the classification of the RSSI value is the false wake-up, enabling the ContikiMAC node enters the sleep mode, and storing the RSSI value in a corresponding group of RSSI values in the RSSI_FALSE list.

7. The method, as claimed in claim 6, wherein, after determining that the RSSI value belongs to idle listening, the method further includes:

if the RSSI value is the same as a previously received RSSI value, increasing a wireless radio power of a transmitting node and considering the RSSI value as a RSSI value threshold; the RSSI value threshold is used to determine radio activity on the channel; if the RSSI value is not the same as the previously received RSSI value, entering, by the ContikiMAC node, the sleep mode.

8. A low-power adaptive device for a MAC layer of a wireless sensor network, comprising a processor configured to:

determine an environmental traffic based on a number of data packets sent and received by nodes within a specified time;

obtain a remaining battery energy percentage;

determine an average node frequency based on a power of the nodes;

set a maximum duty cycle frequency $RDC_{max}$ and a minimum duty cycle frequency $RDC_{min}$;

adjust a current duty cycle frequency based on the environmental traffic when the remaining battery energy percentage is above 50%;

when the remaining battery energy percentage is approximately greater than or equal to 20% and less than or equal to 50%, reduce the maximum duty cycle frequency $RDC_{max}$ to decrease a maximum change in duty cycle frequency; simultaneously, adjust the current duty cycle frequency based on the environmental traffic;

when the remaining battery energy percentage is below 20%, determine the current duty cycle frequency based on a power of a current node and the average node frequency;

wherein when the remaining battery energy percentage is above 50%, the processor is further configured to:

if the current duty cycle frequency (RDC) is greater than the maximum duty cycle frequency ($RDC_{max}$), set $RDC=RDC_{max}$;

if the environmental traffic is greater than or equal to 15 and $RDC_{min} \leq RDC*2 \leq RDC_{max}$, set $RDC=RDC*2$;

if the environmental traffic is greater than or equal to 0 but less than or equal to 5, and $RDC_{min} \leq RDC/2 \leq RDC_{max}$, set $RDC=RDC/2$.

9. A non-transitory computer-readable storage medium storing instructions, executed by a processor, performing the low-power adaptive method for the MAC layer of the wireless sensor network as claimed in claim 1.

10. A low-power adaptive method for a MAC layer of a wireless sensor network, comprising:

determining an environmental traffic based on a number of data packets sent and received by nodes within a specified time;

obtaining a remaining battery energy percentage;

establishing an average node frequency based on a power of the nodes;

setting a maximum duty cycle frequency $RDC_{max}$ and a minimum duty cycle frequency $RDC_{min}$;

when the remaining battery energy percentage is above 50%, adjusting a current duty cycle frequency based on the environmental traffic;

when the remaining battery energy percentage is approximately 20% to 50%, reducing the maximum duty cycle frequency $RDC_{max}$ to decrease a maximum change in duty cycle frequency, while simultaneously adjusting the current duty cycle frequency based on the environmental traffic, comprising:

adjusting the maximum duty cycle frequency $RDC_{max}$ to half of an initially set maximum duty cycle frequency;

if the current duty cycle frequency RDC is greater than the maximum duty cycle frequency $RDC_{max}$, setting $RDC=RDC_{max}$;

if the environmental traffic is greater than or equal to 15 and $RDC_{min}<=RDC*2<=RDC_{max}$, setting $RDC=RDC*2$;

if the environmental traffic is greater than or equal to 0 but less than or equal to 5, and $RDC_{min}<=RDC/2<=RDC_{max}$, setting $RDC=RDC/2$;

when the remaining battery energy percentage is below 20%, determining the current duty cycle frequency based on a power of a current node and the average node frequency.

\* \* \* \* \*